US012396069B2

(12) United States Patent
Kim

(10) Patent No.: US 12,396,069 B2
(45) Date of Patent: Aug. 19, 2025

(54) MICROWAVE BAND INDUCTION HEATING DEVICE

(71) Applicant: KOREA ELECTROTECHNOLOGY RESEARCH INSTITUTE, Changwon-si (KR)

(72) Inventor: Daeho Kim, Gimhae-si (KR)

(73) Assignee: KOREA ELECTROTECHNOLOGY RESEARCH INSTITUTE, Changwon-si (KR)

( * ) Notice: Subject to any disclaimer, the term of this patent is extended or adjusted under 35 U.S.C. 154(b) by 876 days.

(21) Appl. No.: 17/629,382

(22) PCT Filed: May 19, 2020

(86) PCT No.: PCT/KR2020/006561
§ 371 (c)(1),
(2) Date: Jan. 22, 2022

(87) PCT Pub. No.: WO2021/015404
PCT Pub. Date: Jan. 28, 2021

(65) Prior Publication Data

US 2022/0279629 A1 Sep. 1, 2022

(30) Foreign Application Priority Data

Jul. 25, 2019 (KR) ........................ 10-2019-0090067

(51) Int. Cl.
*H05B 6/04* (2006.01)
*H05B 6/68* (2006.01)
(Continued)

(52) U.S. Cl.
CPC ................. *H05B 6/04* (2013.01); *H05B 6/68* (2013.01); *H05B 6/76* (2013.01); *H05B 6/80* (2013.01)

(58) Field of Classification Search
CPC ... H05B 6/04; H05B 6/68; H05B 6/76; H05B 6/80; H05B 6/12; H05B 6/6488; G11B 5/54
(Continued)

(56) References Cited

U.S. PATENT DOCUMENTS 4,147,911 A * 4/1979 Nishitani ................. H05B 6/80 264/432
2018/0007745 A1 1/2018 Smith

FOREIGN PATENT DOCUMENTS

JP 2006-338895 A 12/2006
JP 4034321 B2 1/2008
(Continued)

OTHER PUBLICATIONS

Office Action for KR 10-2019-0090067 by Korean Intellectual Property Office dated Apr. 22, 2024.

*Primary Examiner* — Quang T Van
(74) *Attorney, Agent, or Firm* — BROADVIEW IP LAW, PC

(57) ABSTRACT

A microwave band induction heating device is disclosed. The microwave band induction heating device has a microwave input part for receiving microwaves; a microwave coupler connected to the microwave input part; a dielectric resonator which is disposed so as to be spaced apart from the microwave coupler by a predetermined distance and operates based on the microwaves received from the microwave coupler; a metallic body disposed so as to surround the microwave input part, the microwave coupler, and the dielectric resonator, thereby preventing the microwaves from leaking to the outside; and a microwave leakage prevention part which is coupled to the exterior of the metallic body and assists in prevention of leakage of the
(Continued)

microwaves to the outside in an open space between the inside and the outside of the metallic body.

18 Claims, 10 Drawing Sheets

(51) Int. Cl.
*H05B 6/76* (2006.01)
*H05B 6/80* (2006.01)

(58) Field of Classification Search
USPC ................................ 219/635, 678, 710, 756
See application file for complete search history.

(56) References Cited

FOREIGN PATENT DOCUMENTS

| | | | |
|---|---|---|---|
| JP | 2013101808 | A | 5/2013 |
| JP | 2019087410 | A | 6/2019 |
| KR | 101869601 | | 7/2018 |
| KR | 101977769 | B1 | 5/2019 |

* cited by examiner

MICROWAVE BAND INDUCTION HEATING DEVICE

CROSS-REFERENCE TO RELATED APPLICATIONS

This application is a National Phase Entry Application of PCT Application No. PCT/KR2020/006561 filed on 19 May 2020, which claims priority to Korean Patent Application No. 10-2019-0090067 filed on 25 Jul. 2019 in Korean Intellectual Property Office, the entire contents of which is hereby incorporated by reference in its entirety.

FIELD OF THE INVENTION

The present invention relates to a microwave band induction heating device and, more specifically, to a microwave heating device that generates an induced current in a conductive material using a microwave band magnetic field, thereby heating the same.

BACKGROUND OF THE INVENTION

Microwave is a type of electromagnetic wave, which is also called an ultra-short wave. It is an electromagnetic wave having a wavelength of 1 mm to 1 m and a frequency of 300 MHz to 300 GHz. Microwave was developed and used for radar during World War II, and has since been widely used in communication devices or the like. In particular, its use is increasing in mobile phones, wireless LANs, and the like. During the development of radar in 1946, a phenomenon in which microwaves rapidly heat food was accidentally discovered, which led to the invention of a microwave oven. Microwave heating technology has been developed and applied as a heating method for industrial use as well as home. In the mid-1980s, microwave heating began to be applied to chemical analysis, that is, ashing, extraction, digestion, etc., and in 1986, chemical synthesis was attempted using microwave heating and it was reported that the reaction occurred about 1000 times faster than the conventional heating method. In the 1990s, products developed by microwave chemical apparatus companies became widespread as technology advanced.

As one of the heating mechanisms by microwaves, a dipolar polarization heating mechanism is a process in which heat is generated from polar molecules, which is a principle of dielectric heating. When polar molecules are to match the direction and phase of the electric field that oscillates at an appropriate frequency, the intermolecular force causes resistance against the polar molecules to fail to follow the electric field, thereby causing random motion of the molecules, which generates heat. Water, organic solvents, oxides, etc. can be effectively heated.

As another heating mechanism, an electric resistance heating mechanism is a process in which heat is generated due to resistance to electric current. The oscillating electric field causes vibration of electrons or ions in the conductor to generate an electric current, and this electric current produces heat due to internal resistance. This heating principle is due to the flow of current generated by the electric field, and may be called conduction heating. This microwave conduction heating may occur when a microwave electric field is applied to a conductive material, instead of a dielectric having polar molecules such as water or organic solvents. However, the presence of a conductive material in the microwave resonator greatly affects the electromagnetic field distribution in the resonator depending on the conductivity value, size, shape, etc. of the material. Metal materials with high conductivity are hardly heated because they mostly reflect microwaves, and if the materials have a sharp or thin form, electric discharges may easily occur due to the concentration of the electric field, which may damage the material. A conductive material with low conductivity, such as graphite, may be heated to some extent, but there is a risk of electric discharge depending on the size or form thereof, so in the case of high-temperature heating with high power, this material also has a risk of discharge damage.

The conventional induction heating technology, as a tool for heating a conductive material such as metal, may produce a magnetic field by winding a coil through which a current with a frequency of usually several tens of kHz flows, thereby generating an induced current in a nearby metal to heat the same. In particular, if the metal has magnetism, it can be heated more effectively due to hysteresis loss. This induction heating is widely used in industry for heat treatment of metals or high-temperature melting furnaces, and also became widespread to be utilized as cooking utensils at home. The penetration depth of the induced current generated on the metal surface in the induction heating has a close correlation with the conductivity of the metal, and the higher the frequency, the smaller the penetration depth. Since the usage frequency of induction heating is usually up to several hundred kHz, the penetration depth of the induced current into the metal is about 1 mm (millimeter), so it is suitable for heating materials with a thickness of millimeters such as cooking utensils. However, since a conductive material, which is thin less than 1 μm (micrometer), is much thinner than the penetration depth of the induced current of several tens to hundreds of kHz, the magnetic field transmits therethrough without generating an induced current in the conductive material, failing to heat the same. In the case of heating a conductive thin material (conductive thin film) of 1 μm or less by the electric resistance heating mechanism of the existing microwave heating, it is practically impossible to use the same because discharge easily occurs due to the electric field concentrated at the tip of the conductive thin film.

BRIEF SUMMARY OF THE INVENTION

The present invention has been devised to solve the above problems, and the present invention is to provide a microwave heating device that heats a conductive material by generating an induced current therein using a microwave band magnetic field and selectively heats a conductive material, which is very thin less than a micrometer, such as a conductive thin film, a fine wire, a conductive fiber, a chip device having a thin film electrode, or the like.

If induction heating is possible in a frequency band of several GHz, an induced current penetration depth is about 1 μm for a material having high conductivity, such as copper. This microwave band induction heating may be a means for very effectively heating the conductive thin film. The present invention intends to describe a method capable of implementing microwave induction heating technology as a means for selectively heating a conductive material with a very small thickness of about 1 μm, such as a conductive thin film, a wire, or the like.

In view of the foregoing, a microwave induction heating device according to one aspect of the present invention may include: a microwave input part configured to receive a microwave; a microwave coupler connected to the microwave input part; a dielectric resonator disposed to be spaced a predetermined distance apart from the microwave coupler and configured to operate by receiving a microwave from the microwave coupler; a metallic body disposed to surround the microwave input part, the microwave coupler, and the dielectric resonator to prevent leakage of the microwave to the outside; and a microwave leakage prevention part coupled to the exterior of the metallic body and configured to assist to block leakage of the microwave to the outside in an open space between the inside and outside of the metallic body, and may be configured to microwave induction-heat a target material disposed to be spaced a predetermined distance apart from the dielectric resonator.

The target material is disposed on the top, bottom, side, or central axis of a through-hole of the dielectric resonator. The target material includes a conductive material having a thickness with sheet resistance of 0.1 ohm/square or more, or a chip device having a thin film electrode. In addition, the target material includes a flat surface, a spherical surface, a curved surface, a cylindrical surface, or a combination thereof.

The dielectric resonator includes a cylindrical form, a hexahedral column form, a spherical form, a rounded corner form, a predetermined arbitrary form without symmetry, a form with a through-hole in the center, a form in which a resonator is divided vertically or horizontally and arranged to be spaced a predetermined distance apart from each other, or a form in which a plurality of resonators is combined.

The dielectric resonator may form a magnetic field for induction-heating the target material. In addition, the dielectric resonator may be configured as a dielectric having a dielectric constant value of 3 or more and a loss tangent value of 0.0005 or less.

The microwave input part may include a coaxial waveguide form coupled to the coaxial waveguide of the metallic body.

The microwave coupler may include a loop-shaped metal disposed to be spaced a predetermined distance apart from the bottom of the dielectric resonator in the vertical direction.

The microwave coupler may include a bar shape disposed to be spaced a predetermined distance apart from the side or bottom of the dielectric resonator.

The microwave induction heating device may further include a control device configured to adjust the separation distance between the microwave coupler and the dielectric resonator on the basis of the coupling constant of the microwave coupler and the dielectric resonator to control the intensity of a microwave transmitted to the dielectric resonator.

The control device may control the separation distance between the sidewall of the metallic body and the dielectric resonator to adjust the resonance frequency of the electromagnetic field in a resonance mode of the dielectric resonator.

The microwave leakage prevention part may include a cavity resonator or a waveguide coupled around the open space connecting the inside and the outside of the metallic body on the periphery of a path through which the target material is loaded or unloaded.

A structure for induction heating of the target material that is loaded above the opening of the metallic body on the dielectric resonator so as to be spaced a predetermined distance apart from the top of the dielectric resonator may be included. Here, the microwave leakage prevention part may include a form in which a plurality of rods for cavity resonance is erected in a direction parallel to the opening to be one-dimensionally or two-dimensionally arranged on a plate fixed along the exterior perimeter around the opening of the metallic body.

The dielectric resonator may include a through-hole on the central axis and an opening formed in at least one of the top and bottom of the metallic body on the central axis of the through-hole, and the target material may be loaded to or unloaded from the through-hole through the open space of the opening. Here, the microwave leakage prevention part may include a form in which a plurality of rods for cavity resonance is one-dimensionally or two-dimensionally arranged on a plate fixed along the exterior perimeter around the opening of the metallic body such that the longitudinal direction thereof is perpendicular to the central axis.

The microwave induction heating device of the present invention may further include a loader configured to load or unload the target material by moving the same, wherein the loader continuously or discontinuously may change the induction heating area of the target material.

The microwave induction heating device may further include one or more second dielectric resonators and one or more second microwave couplers inside the metallic body, and the one or more second microwave couplers may be configured to apply microwaves to the one or more second dielectric resonators, respectively.

BRIEF DESCRIPTION OF THE DRAWINGS

The accompanying drawings provided as part of the detailed description to help understanding of the present invention provide embodiments of the present invention and illustrate the technical idea of the present invention along with the detailed description.

DETAILED DESCRIPTION OF THE INVENTION

Figure 1:
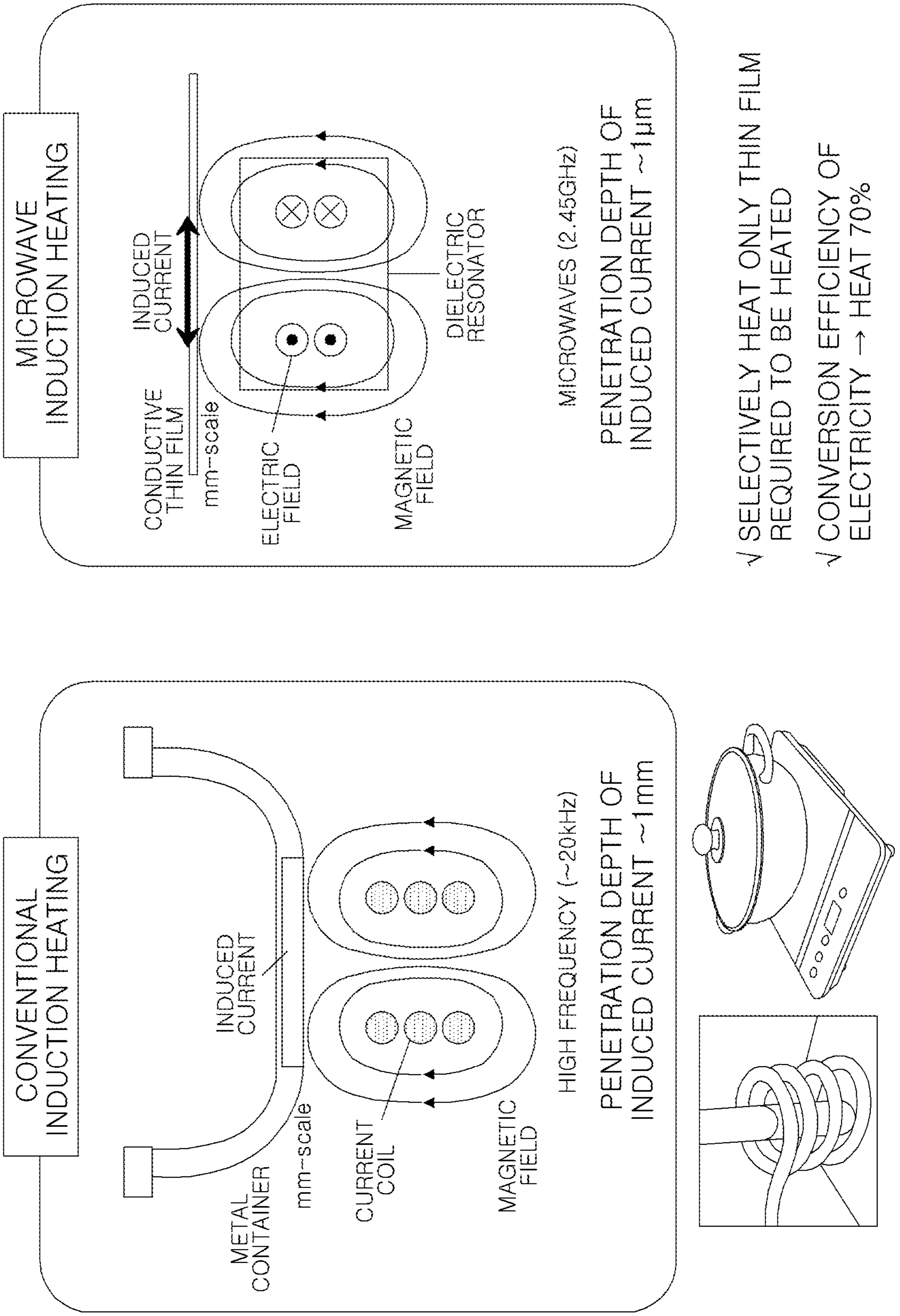
FIG. 1 is a view provided to compare and explain induced current generation methods and penetration depths of the induced current between induction heating according to the prior art and microwave induction heating according to the present invention.

Hereinafter, the present invention will be described in detail with reference to the accompanying drawings. In this case, the same elements will be preferably denoted by the same reference numerals in the respective drawings. In addition, detailed descriptions of already known functions and/or configurations will be omitted. The content disclosed below will focus on parts necessary to understand operations according to various embodiments, and descriptions of elements that may obscure the gist of the description will be omitted. In addition, some elements may be exaggerated, omitted, or schematically illustrated in the drawings. The size of each element does not fully reflect the actual size, so the content described herein is not limited to the relative sizes or spacing of the elements drawn in the respective drawings.

In describing embodiments of the present invention, if it is determined that a detailed description of the known technology related to the present invention may unnecessarily obscure the gist of the present invention, the detailed description will be omitted. In addition, the terms to be described below are defined in consideration of the functions in the present invention, which may vary depending on the intention of the user or operator, custom, and the like. Therefore, the definition should be made based on the content throughout this specification. The terminology used in the detailed description is intended to describe embodiments of the present invention, and should not be construed to be limited. Unless explicitly used otherwise, the expressions in the singular encompass the expressions in the plural. In the description, expressions such as "comprise" or "include" are intended to indicate certain features, numbers, steps, operations, elements, or some or a combination thereof, and should not be construed to exclude the presence or possibility of other features, numbers, steps, operations, elements, or some or a combination thereof, in addition to those described.

In addition, terms such as first, second, etc. may be used to describe various elements, but the elements are not limited to the terms, and the terms are used only for the purpose of distinguishing one element from other elements.

Hereinafter, in the present specification, a conductive thin film, a fine wire, a conductive fiber, a chip device having a thin film electrode, and the like, which are targets of induction heating using microwave, will be collectively referred to as a conductive material.

Modern high-tech devices such as displays, semiconductor devices, solar cells, and MLCCs (Multi-Layer Ceramic Capacitors) all have thin film electrodes. These devices require materials with necessary performance to be produced through high-temperature heat treatment during numerous processes in the manufacturing procedure, but existing heating methods require a long heat treatment time, resulting in low productivity and high energy cost, or make it impossible to perform heat treatment at a high temperature due to a limit to the heating temperature of a substrate. If a very thin conductive material in the form of the thin film is able to be selectively and quickly heated, productivity and device performance that exceed existing processes can be obtained.

FIG. 1 is a view provided to compare and explain induced current generation methods and penetration depths of the induced current between conventional induction heating and microwave induction heating of the present invention.

Conventional induction heating uses heat generated when bringing a metal close to the magnetic field generated when a current having a frequency of several tens of kHz flows through a coil to generate an induced current on the metal surface. In the existing induction heating, the penetration depth of the induced current has a value of about 1 mm, thereby effectively heating cooking utensils or the like.

On the other hand, since microwave induction heating uses a higher frequency (e.g., 300 MHz to 300 GHz), a magnetic field required for induction heating may be generated using a dielectric resonator instead of a coil through which a current flows. The penetration depth of the current induced in the metal by the 2.45 GHz microwave, which is usually used for heating, is about 1 μm (micrometer), so it is possible to selectively heat a thin film having a thickness on the nanometer scale. The energy conversion efficiency for generating heat by making a microwave from electricity reaches 70%, and only the nano-thin film requiring high temperature may be selectively heated, so the energy efficiency is very good.

Figure 2:
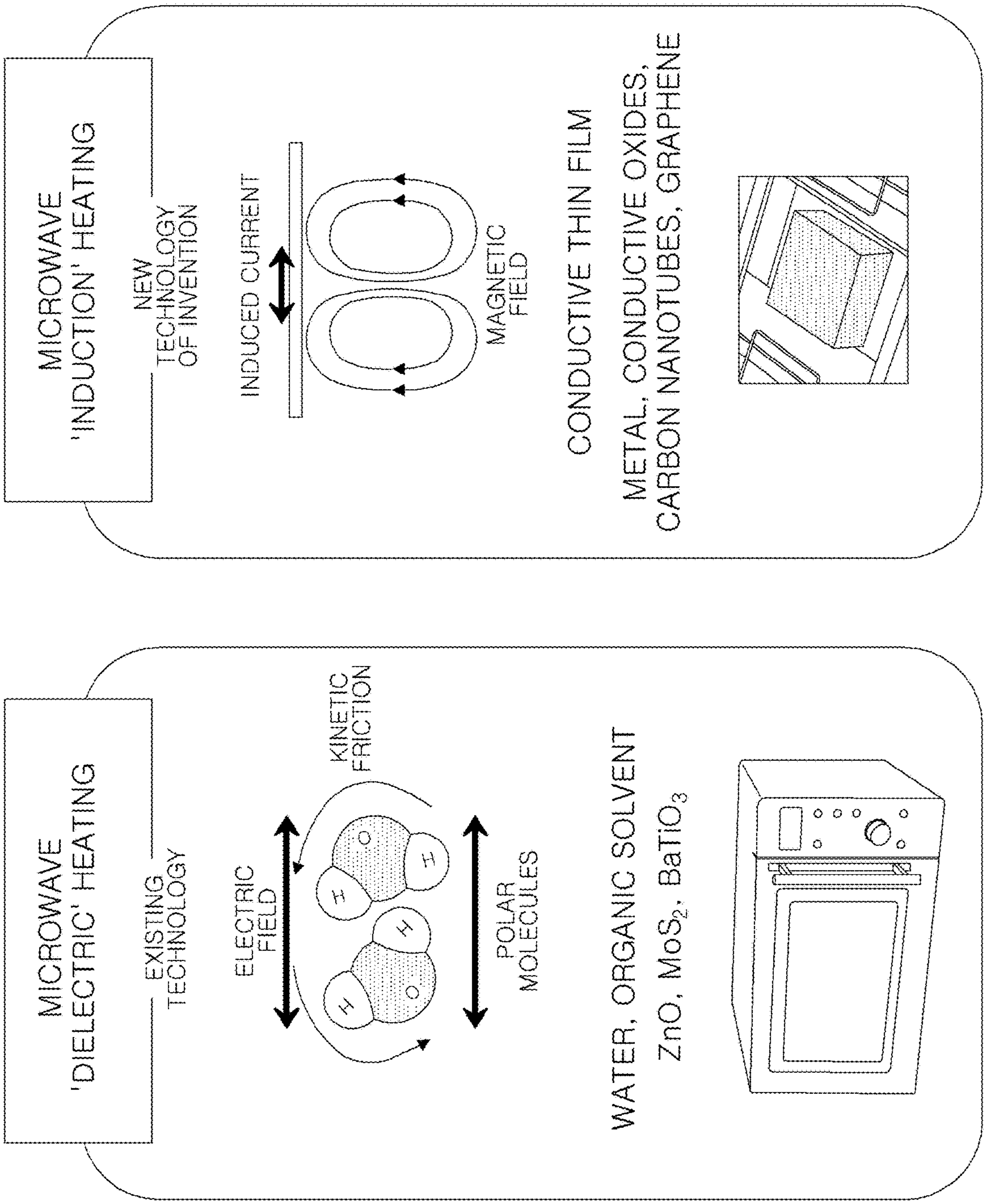
FIG. 2 is a view provided to compare and explain heating methods and heating targets between microwave dielectric heating according to the prior art and microwave induction heating according to the present invention.

FIG. 2 is a view provided to compare and explain heating methods and heating targets between conventional microwave dielectric heating and microwave induction heating of the present invention.

Conventional microwave heating used in microwave ovens, etc. is "dielectric" heating in which when microwaves are applied to polar molecules, the polar molecules rotate and vibrate so that heating is performed by kinetic friction occurring between the polar molecules. Therefore, water, organic solvents, some oxides, etc. may be effectively heated.

Microwave "induction" heating is a heating method that uses resistance heat by an induced current generated on a conductive surface by the microwave magnetic field. Since the depth at which the microwave induced current is generated on the surface is about 1 μm to the metal, it is possible to effectively heat a metal having a thickness of about 1 μm or less (or a thickness causing the sheet resistance of 0.1 ohm/square or more) or a conductive material having a very small thicknesses less than a micrometer, such as a conductive thin film, a fine wire, a conductive fiber, a conductive oxide, a carbon nanotube, a nano-thin film such as graphene, a chip device having a thin film electrode, or the like.

Figure 3:
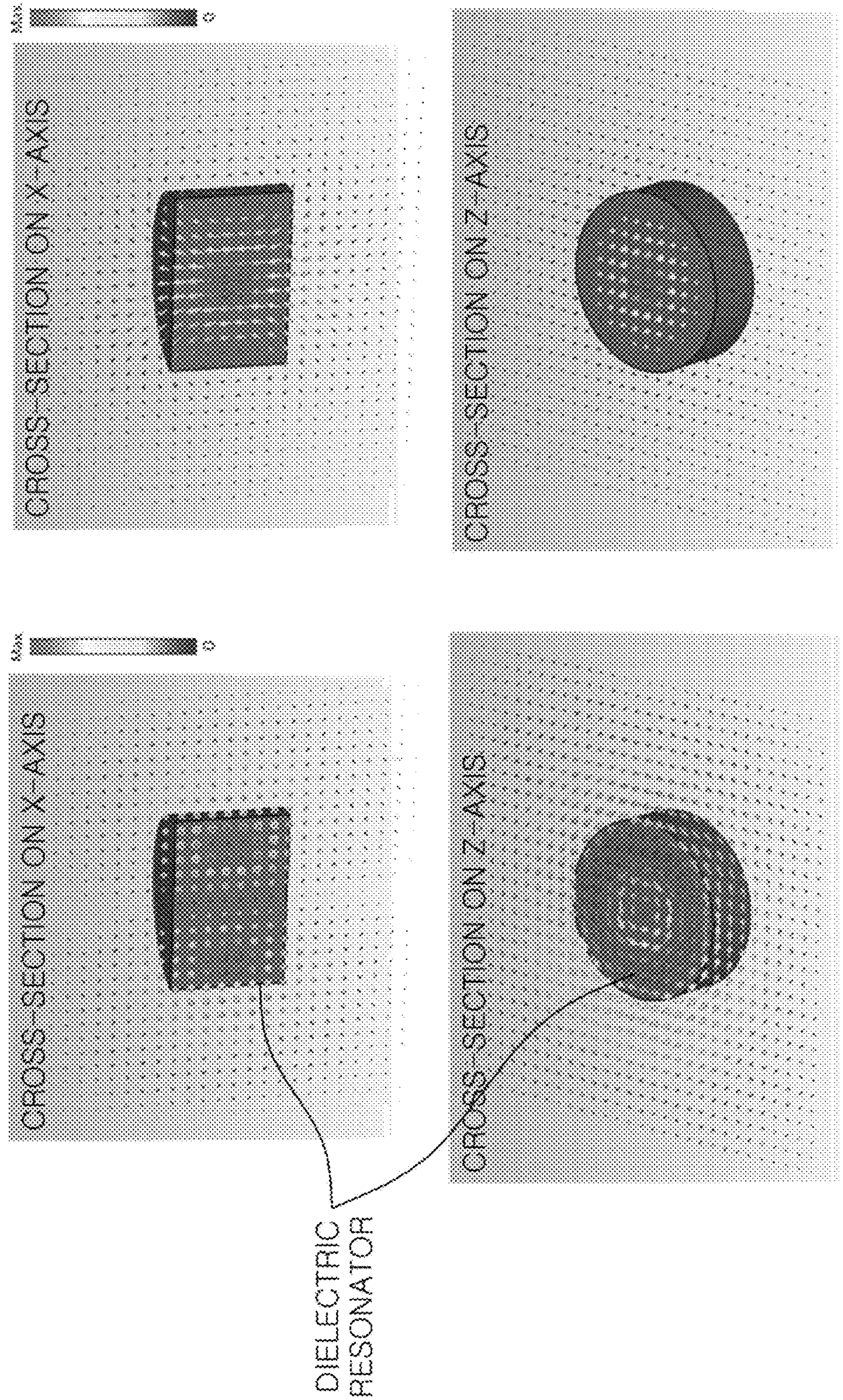
FIG. 3 is a view illustrating an electric field pattern (the left drawing) and a magnetic field pattern (the right drawing) in a dielectric resonator for microwave induction heating of the present invention.

FIG. 3 is a view illustrating an electric field pattern (the left drawing) and a magnetic field pattern (the right drawing) in a dielectric resonator for microwave induction heating of the present invention.

The most essential element for realizing microwave induction heating is a dielectric resonator. The dielectric resonator uses a dielectric having a dielectric constant value of 3 or more and a loss tangent value of 0.0005 or less. The electromagnetic field patterns in a basic resonance mode produced by the dielectric resonator include an electric field pattern (the left drawing) that rotates about the central axis of the dielectric and a magnetic field pattern (the right drawing) that exits along the central axis to circle around to the exterior and returns to the central axis as shown in FIG. 3. The magnetic field pattern of a dielectric resonator having a cylindrical form shown in FIG. 3 (or a column form having a predetermined length, such as a hexahedron) is very similar to that produced by winding a coil (see FIG. 1) through which a current flows in the conventional induction heating. The electric field pattern of the microwave dielectric resonator is characterized in that the value thereof becomes 0 on the central axis and approaches 0 as moving to the exterior of the dielectric resonator by a predetermined distance or more to almost disappears. The most important fact in the electromagnetic field formation pattern of the dielectric resonator in realizing microwave induction heating is that the electric field mainly exists in the form of a loop that rotates in the dielectric and that the magnetic field exists in the form of a loop so as to come out through the central axis, spread out to the exterior, and return to the central axis.

Figure 4:
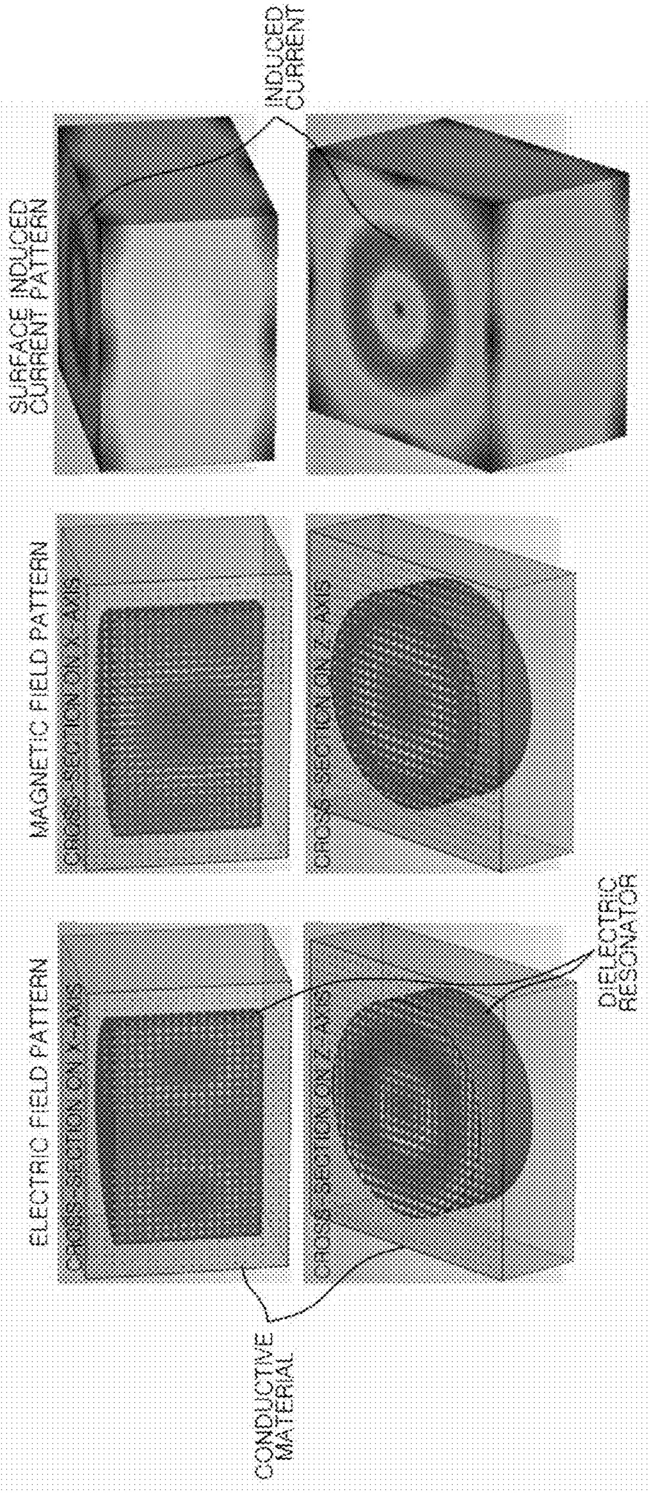
FIG. 4 is a view illustrating a change in the electromagnetic field pattern and a surface induced current in a dielectric resonator in the case where the dielectric resonator for microwave induction heating of the present invention is surrounded by conductive materials.

FIG. 4 is a view illustrating a change in the electromagnetic field pattern and a surface induced current in a dielectric resonator in the case where the dielectric resonator for microwave induction heating of the present invention is surrounded by conductive materials.

In the case where a dielectric resonator is surrounded by a conductive material as shown in FIG. 4, the electromagnetic field pattern of the microwave is transformed into a compressed form in the internal space. At this time, only an electric field in a direction perpendicular to the surface on which the conductive material exists and a magnetic field in a direction parallel to the surface on which the conductive material exists may exist due to general boundary conditions of the electromagnetic field. As a result, when the dielectric resonator is surrounded by a conductive material, an electric field does not exist in the conductive material, and only a magnetic field parallel to the surface of the conductive material exists, so that an induced current may be generated on the surface of the conductive material by the magnetic field. The electromagnetic field in the above pattern enables the conductive thin film to be induction-heated only by the magnetic field without being exposed to the risk of electric field discharge.

Figure 5:
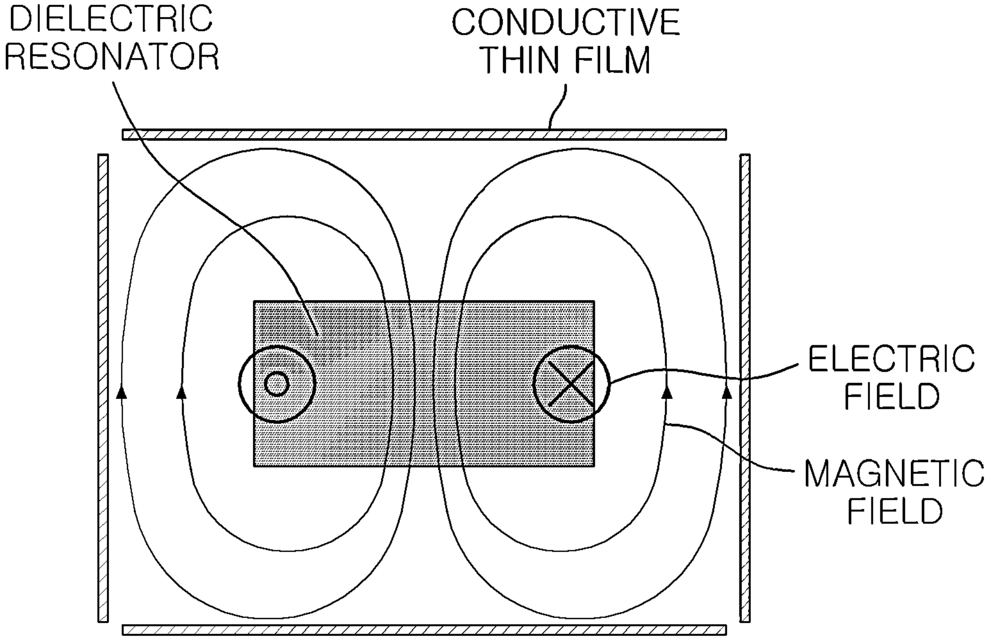
FIG. 5 is a view illustrating the positions of conductive materials capable of microwave induction heating in the case where a dielectric resonator for microwave induction heating of the present invention is surrounded by conductive materials (thin films).

FIG. 5 is a view illustrating the position of a conductive material capable of microwave induction heating in the case where a dielectric resonator for microwave induction heating of the present invention is surrounded by conductive materials (thin films).

As shown in FIG. 5, in the case where a dielectric resonator is surrounded by a hexahedral conductive material (thin film), the positions of the conductive material (thin film) capable of being induction-heated by microwaves correspond to all surfaces of the conductive material (thin film) positioned on the exterior of the upper and lower surfaces and side surfaces of the dielectric resonator. As described above, since the conductive material (thin film) can be simultaneously heated at all positions, only one side surface thereof may be heated while the other side surfaces thereof are not used for heating.

Figure 6:
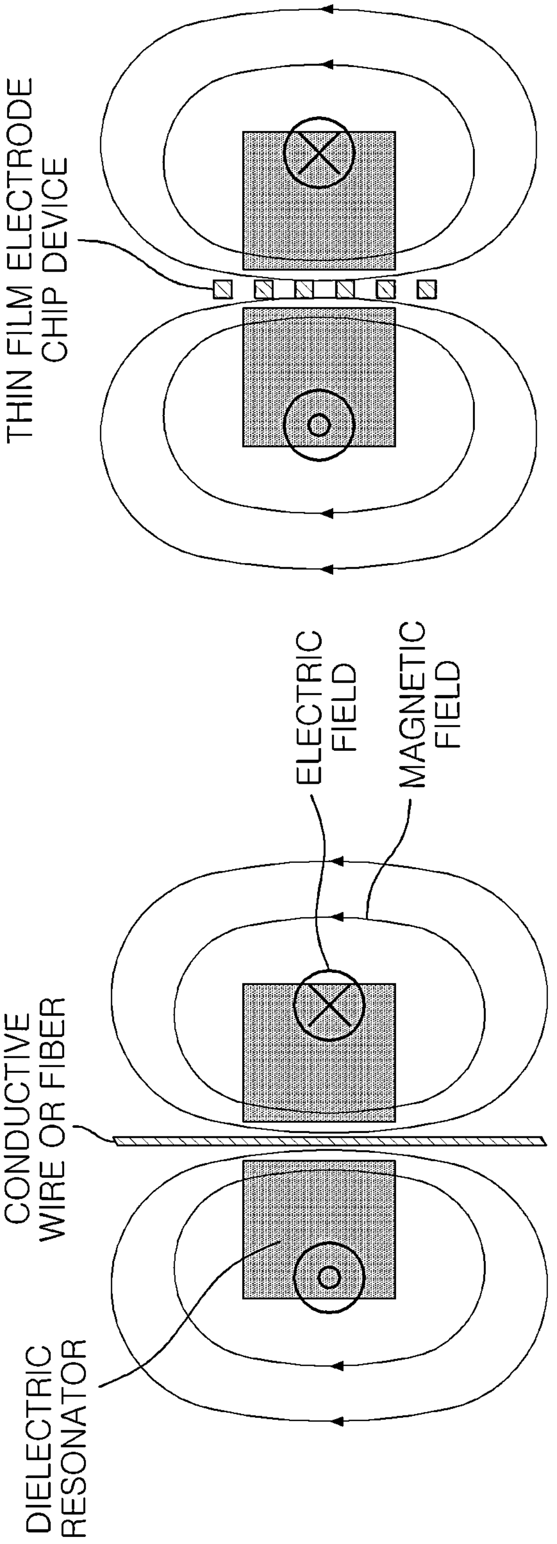
FIG. 6 is a view illustrating the heating of a conductive material positioned on the central axis of a dielectric resonator for microwave induction heating of the present invention.

FIG. 6 is a view illustrating the heating of a conductive material placed on the central axis of a dielectric resonator for microwave induction heating of the present invention.

As shown in FIG. 6, the central axis of the dielectric resonator is an area where a strong magnetic field exists without an electric field, like the exterior thereof. Therefore, as shown in the drawing, it is possible to heat a metal having a thickness of about 1 μm or less (or a thickness causing the sheet resistance of 0.1 ohm/square or more), a conductive thin film, a fine wire, a conductive fiber, a conductive oxide, a carbon nanotube, a nano-thin film such as graphene, or the like, which is placed on the central axis of the dielectric resonator, or it is possible to effectively heat a chip device having a thin film electrode.

Figure 7:
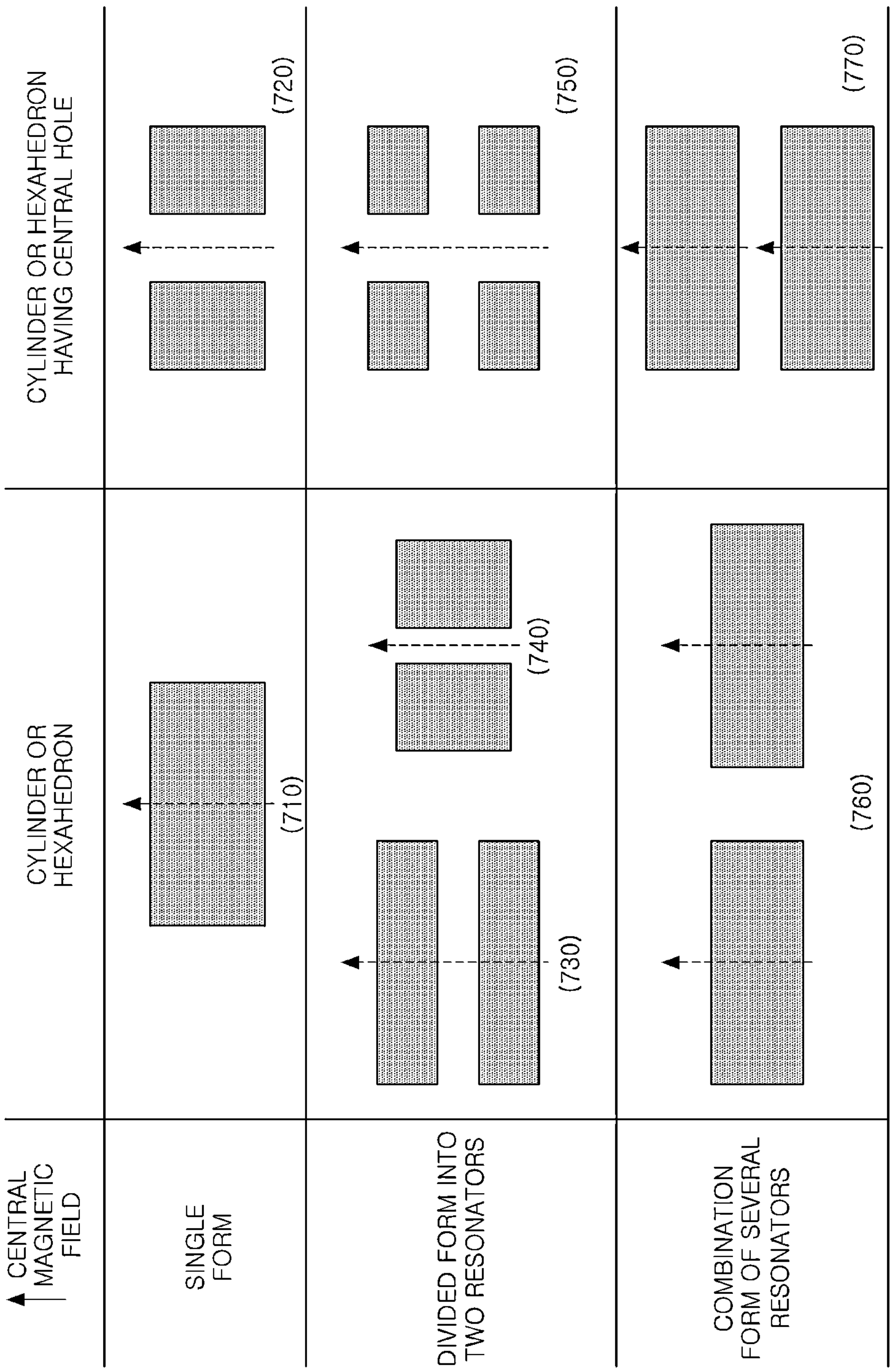
FIG. 7 is a view illustrating various embodiments of a dielectric resonator for microwave induction heating of the present invention.

FIG. 7 is a view illustrating various embodiments of a dielectric resonator for microwave induction heating of the present invention.

As shown in FIG. 7, a dielectric resonator for microwave induction heating may be configured in various column forms 710 having a predetermined length, such as a cylindrical form or a hexahedral form to generate a predetermined strength of magnetic field, and may be configured in a form 720 having a through-hole in the central axis direction at the center thereof.

In addition, the dielectric resonator for microwave induction heating may include a form 730 in which the dielectric resonator 710 in the column form is divided vertically and arranged, a form 740 in which the dielectric resonator 710 is divided horizontally and arranged side by side (two divided hexahedrons, divided semi-circular columns, etc.), and the like, and include a form 750 in which the dielectric resonators 720 having a through-hole formed at the center thereof are vertically arranged. In some cases, a form in which the dielectric resonators 720 having a through-hole formed therein are arranged side by side may be used.

In addition, the dielectric resonator for microwave induction heating may be configured in a form 760 in which two or more dielectric resonators capable of generating a predetermined strength of magnetic field are arranged left and right or a form 770 in which two or more dielectric resonators are arranged so as to generate a continuous magnetic field along the central axis, thereby heating a larger area or with a high strength of magnetic field.

Hereinafter, embodiments of microwave induction heating devices 100 and 200 of the present invention will be described with reference to FIGS. 8 to 10.

The microwave induction heating device 100 and 200) of the present invention heats a heating target material 10 such as a conductive thin film spaced a predetermined distance apart from the dielectric resonator 130 according to the principle of microwave induction heating based on the above principle. For example, as described above, the heating target material 10 placed on the top, bottom, side, or central axis of the through-hole of the dielectric resonator 130 is subjected to microwave induction heating. The heating target material 10 includes a metal having a thickness of 1 μm or less or a very thin conductive material having a thickness less than a micrometer, such as a conductive thin film, a fine wire, a conductive fiber, a conductive oxide, a carbon nanotube, a nano-thin film such as graphene, a chip device having a thin film electrode, or the like. The heating target material 10 may have various forms such as a flat surface, a spherical surface, a curved surface, a cylindrical surface, or a combination thereof.

In addition, the dielectric resonator 130 may include a cylindrical or hexahedral column form (see 710 in FIG. 7), a spherical form, a rounded corner form, a predetermined arbitrary form without symmetry, a form having a through-hole at the center (see 720 in FIG. 7), a form in which one resonator is divided vertically or horizontally and arranged to be spaced a predetermined distance apart from each other (see 730, 740, and 750 in FIG. 7), a form in which a plurality of resonators are combined (see 760 and 770 in FIG. 7), or the like.

Figure 8:
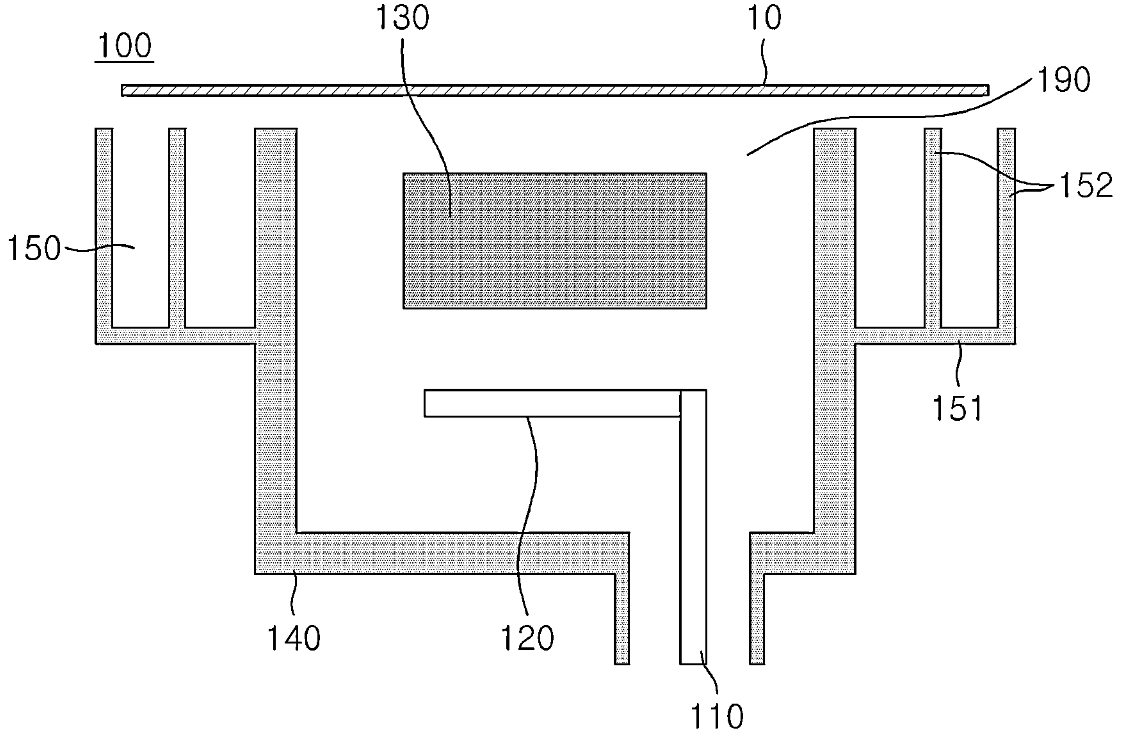
FIG. 8 is a view illustrating a microwave induction heating device 100 according to an embodiment of the present invention.

FIG. 8 is a view illustrating a microwave induction heating device 100 according to an embodiment of the present invention.

Referring to FIG. 8, a microwave induction heating device 100 according to an embodiment of the present invention includes a microwave input part 110 in the form of a microwave waveguide that receives a microwave, a microwave coupler 120 connected to the microwave input part 110, a dielectric resonator 130 spaced a predetermined distance apart from the microwave coupler 120 and receiving the microwave from the microwave coupler 120 to operate, a metallic body 140 disposed to surround the microwave input part 110, the microwave coupler 120, and the dielectric resonator 130 to prevent leakage of the microwave to the outside, and a microwave leakage prevention part 150, coupled to the exterior of the metallic body 140, that is configured in the form of a waveguide or resonator (cavity resonator) coupled around an open space (the space connecting the inside and the outside of the metallic body 140 around a path where the heating target material 10 such as conductive thin film or the like is loaded/unloaded) between the inside and the outside of the metallic body 140 and has a resonance frequency slightly higher than the frequency of the input microwave in order to assist prevention of leakage of the microwave to the outside.

The microwave input part 110 may be in the form of a coaxial waveguide. For example, the microwave input part 100 may be in the form of a coaxial waveguide coupled to a coaxial waveguide of the metallic body 140. The microwave input part 110 may also use a waveguide in a rectangular or circular form. The form of the microwave input part 110 is preferably determined according to the form of the microwave coupler 120 to be used.

The microwave coupler 120 may be a metal having a loop shape, which is spaced a predetermined distance apart from the bottom of the dielectric resonator 130 in the vertical direction. In addition, the microwave coupler 120 may be configured in a bar form, which is spaced a predetermined distance apart from the side surface or lower surface of the exterior of the dielectric resonator 130. The microwave coupler 120 may be disposed in a direction perpendicular to the longitudinal direction of the microwave input part 110, that is, in a direction parallel to the bottom of the dielectric resonator 130.

The microwave coupler 120 functions to transmit a microwave input through the microwave input part 110 to the dielectric resonator 130. Based on the coupling coefficient of the microwave coupler 120 and the dielectric resonator 130, the microwave coupler 120 may adjust the separation distance to the dielectric resonator 130 under the control of a control device (not shown) (for example, the end of the coupler may move along a predetermined guide), thereby adjusting the intensity of a microwave transmitted to the dielectric resonator 130. Accordingly, it is possible to perform control such that all input microwave energy is consumed for heat.

The metallic body 140 may adjust the resonance frequency of the electromagnetic field in the resonance mode of the dielectric resonator 130 by adjusting the separation distance between the sidewall of the metallic body 140 and the dielectric resonator 130 under the control of a control device (not shown) (for example, all/part of the sidewall may move along a predetermined guide), as well as serving to prevent the microwave from leaking to the outside. The metallic body 140 may be used as a tool to deal with an error in the resonance frequency of the dielectric resonator 130 or a change in the frequency of the supplied microwave, which appears due to a limit to the manufacturing precision of the dielectric resonator 130.

Figure 9:
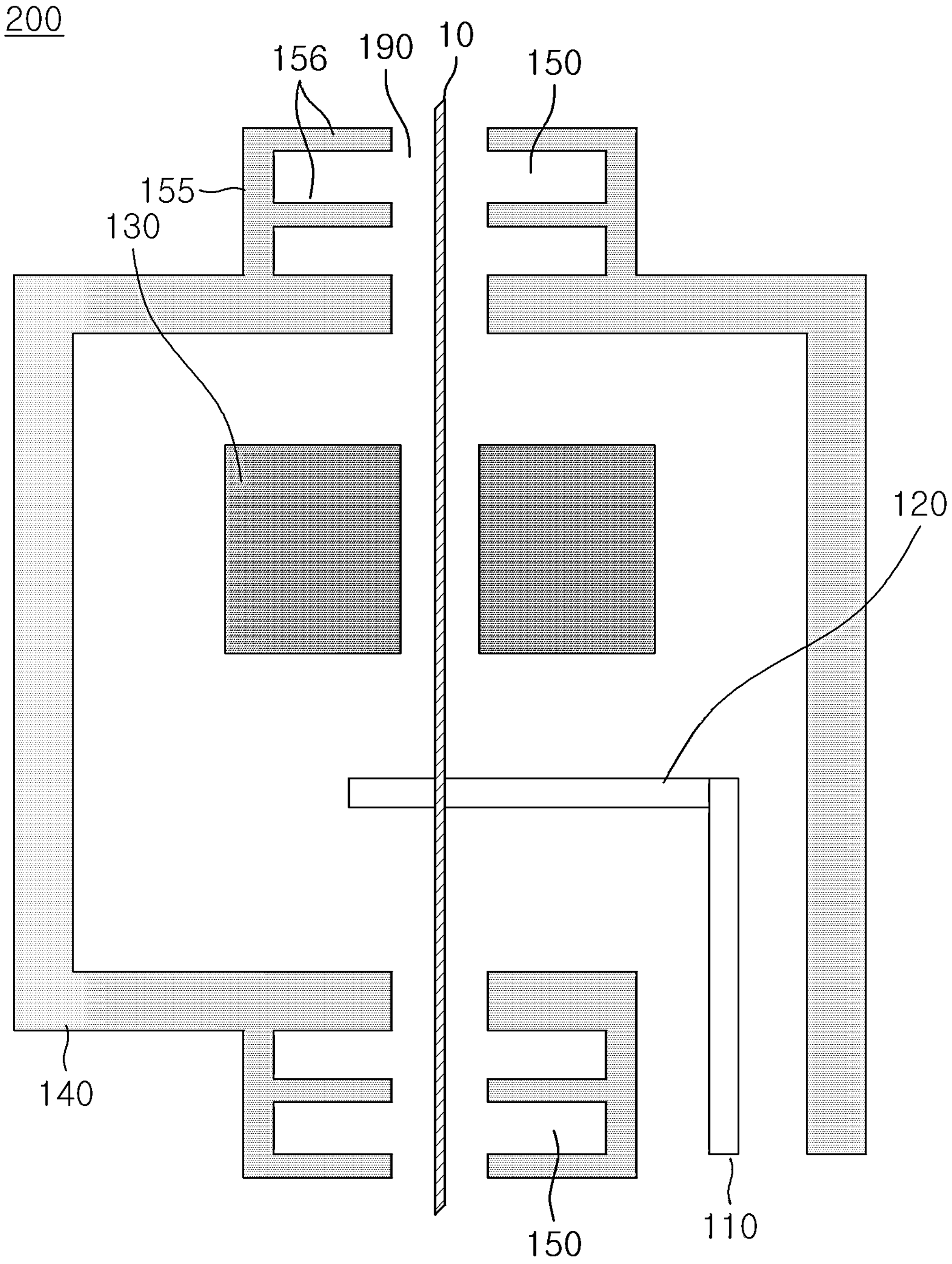
FIGS. 9 and 10 are views illustrating a microwave induction heating device 200 according to another embodiment of the present invention.
Figure 10:
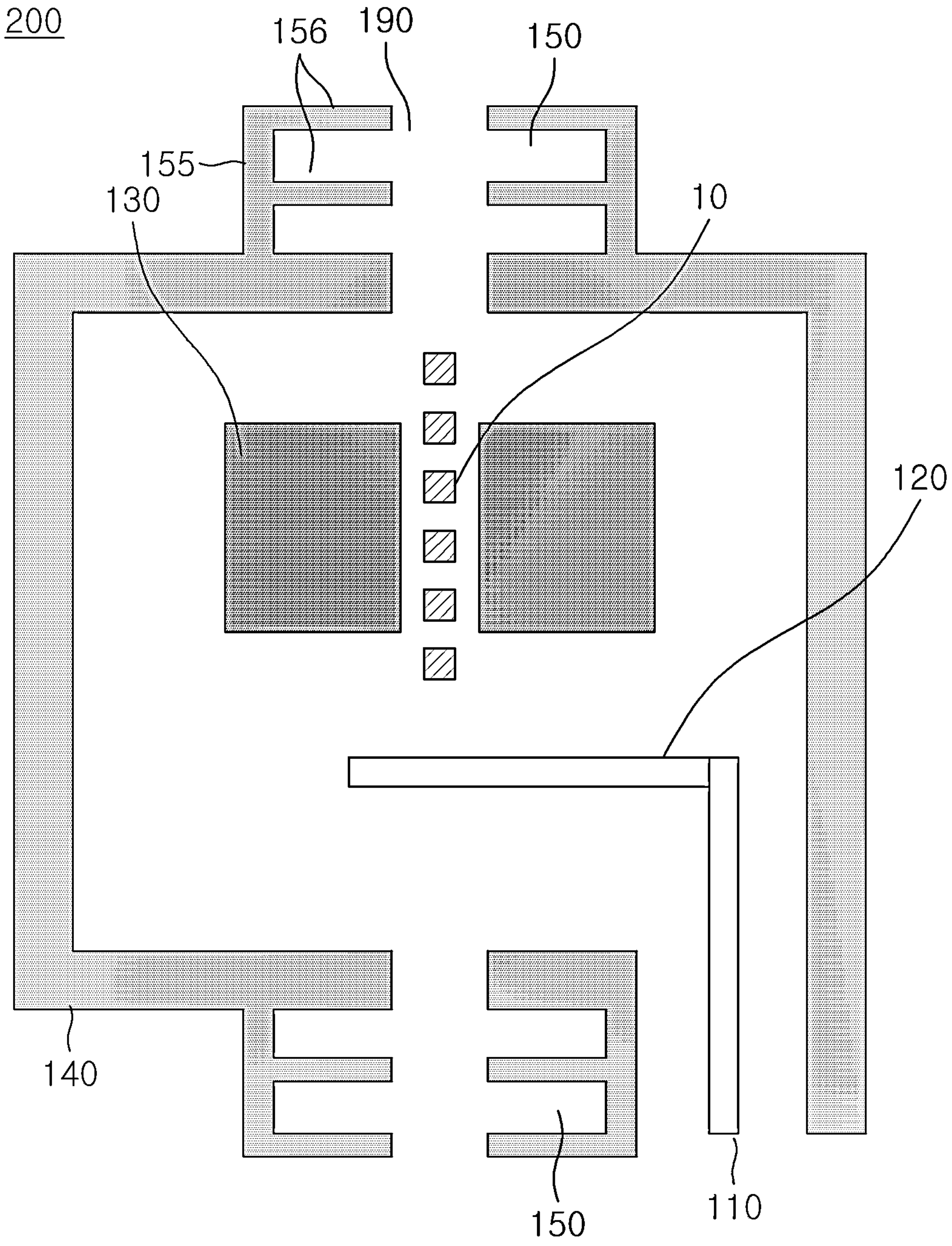

The microwave leakage prevention part 150 may be a cavity resonator or waveguide that may be coupled around the open space connecting the inside and outside of the metallic body 140 on the periphery of a path through which the heating target material 10 is loaded or unloaded (e.g., loading/unloading in the left-right direction in FIG. 8 and loading/unloading through the central through-hole in FIGS. 9 and 10). Here, the cavity resonator may be designed to have a resonance frequency higher than the frequency of the input microwave (e.g., a slightly higher resonance frequency such as several tens of kHz to several hundreds of kHz), and the waveguide may be designed to have a waveguide cutoff frequency higher than the frequency of the input microwave (e.g., a slightly higher cutoff frequency such as tens of kHz to hundreds of kHz). The microwave leakage prevention part 150 corresponds to a choke cavity type cavity resonator or waveguide that prevents a microwave of a specific frequency from passing therethrough as described above. The cavity resonator or waveguide may include a form in which a plurality of (metal) bars (or rods) is arranged one-dimensionally or two-dimensionally on a fixed plate.

In FIG. 8, a structure for induction heating of the heating target material 10 loaded over the opening 190 of the metallic body 140 on the dielectric resonator 130 to be spaced a predetermined distance from the top of the dielectric resonator 130 has been described. Here, the microwave leakage prevention part 150 is configured such that a plurality of (metal) bars (rods) 152 for cavity resonance is erected in a direction parallel to the opening 190 to be one-dimensionally or two-dimensionally arranged on a plate (e.g., a metal plate) 151 fixed along the exterior perimeter around the opening 190 of the metallic body 140. The drawing shows a cross-sectional view of the configuration of the plate 151 and the plurality of (metal) bars (rods) 152.

Hereinafter, a method of induction-heating the heating target material 10 such as a conductive wire or a chip device including a thin film electrode, which is long and thin enough to be inserted into the through-hole on the central axis of the dielectric resonator 130, will be described with reference to FIGS. 9 and 10.

FIGS. 9 and 10 are views illustrating a microwave induction heating device 200 according to another embodiment of the present invention. First, referring to FIG. 9, in the case where a conductive material 10 such as a conductive wire or fiber is to be heated using a magnetic field on the central axis of the dielectric resonator 130, the dielectric resonator 130 having a through-hole on the central axis may be used, and a microwave leakage prevention part 150 may be installed in the open space of the opening 190, which is formed on at least one of the top or the bottom of the metallic body 140 such that a heating target material 10 may enter and exit therethrough.

Meanwhile, referring to FIG. 10, a heating target material 10 including very small devices such as chip devices including a thin film electrode may be heated by microwave induction heating according to the present invention. Similar to the method of heating the conductive wire in FIG. 9, a dielectric resonator 130 having a through-hole formed on the central axis may be used, and a microwave leakage prevention part 150 may be installed in the open space of the opening 190, which is formed on at least one of the top or the bottom of the metallic body 140 such that the heating target material 10 may enter and exit therethrough.

As described above, as shown in FIGS. 9 and 10, in the microwave induction heating device 200, the dielectric resonator 130 may include a through-hole formed on the central axis, and an opening 190 formed on at least one of the top or bottom of the metallic body 140 on the central axis of the through-hole. The heating target material 10 may be loaded to or unloaded from the through-hole through the open space of the opening 190. Here, the microwave leakage prevention part 150 is configured such that a plurality of (metal) bars (rods) 156 for cavity resonance is one-dimensionally or two-dimensionally arranged on a plate 155 fixed along the exterior perimeter around the opening 190 of the metallic body 140 such that the longitudinal direction thereof is perpendicular to the central axis. The drawing shows a cross-sectional view of the configuration of the plate 155 and the plurality of (metal) bars (rods) 156.

Although not shown in detail in FIGS. 8, 9, and 10, the microwave induction heating device according to the present invention may further include a loader for moving and loading the heating target material 10 such that a heating portion thereof is positioned at a predetermined distance from the dielectric resonator 130 or unloading the heating target material 10 to be removed from the heating position after the induction heating. Such a loader may be an element encompassing a means for holding the heating target material 10, an actuator for pushing or pulling the heating target material 10, a guide means for providing a transport path of the heating target material 10, and the like.

The loader may operate under the control of the aforementioned control device, which performs overall control of the microwave induction heating device according to the present invention, and the loader may move the heating target material 10 according to the control of the control device, thereby continuously changing the induction heating area of the heating target material 10, and, in some cases, may discontinuously move the heating target material 10 as necessary.

In addition, although not shown in detail in FIGS. 8, 9 and 10, the microwave induction heating device according to the present invention may have two or more dielectric resonators provided inside the metallic body 140. In this case, microwave couplers corresponding to the respective dielectric resonators may be provided. Here, the respective microwave coupler may apply microwaves to the respective dielectric resonators according to the control of the control device.

In this case, one microwave input part 110 may be commonly connected to the microwave couplers, or respective microwave input parts coupled to the respective microwave couplers may be provided. As described in FIG. 7, a plurality of dielectric resonators may be provided in the form 760 in which two or more dielectric resonators are arranged side by side or in the form 770 in which two or more dielectric resonators are arranged vertically such that the magnetic field is continuous on the central axis.

As described above, the microwave induction heating device according to the present invention may selectively heat a conductive material with a very thin thickness less than a micrometer, such as a conductive thin film, a fine wire, a conductive fiber, a chip device having a thin film electrode, or the like. Since only a very small amount of conductive material required to be heated is selectively heated, it is possible to heat the material to a high temperature at a much faster rate with much less energy. The microwave induction heating device lowers production costs by reducing energy consumption, as well as dramatically improving the speed of a heat treatment process, and maintains much lower ambient temperature, enabling heat treatment of materials that cannot be heated to a high temperature.

As described above, although the present invention has been described by specific matters such as specific elements and limited embodiments and drawings, these are only provided to help overall understanding of the present invention, and the present invention is not limited to the above embodiments, and those skilled in the art to which the present invention pertains will be able to make various modifications and changes without departing from the essential characteristics of the present invention. Therefore, the idea of the present invention should not be limited to the described embodiments, and all technical ideas equivalent to the claims or having equivalent modifications thereof, as well as the claims to be described later, should be construed to be included in the scope of the present invention.

What is claimed is:

1. A microwave induction heating device comprising:

a microwave input part configured to receive a microwave;

a microwave coupler connected to the microwave input part;

a dielectric resonator disposed to be spaced a predetermined distance apart from the microwave coupler and configured to operate based on a microwave received from the microwave coupler;

a metallic body disposed to surround the microwave input part, the microwave coupler, and the dielectric resonator to prevent leakage of the microwave to the outside; and a microwave leakage prevention part coupled to the exterior of the metallic body and configured to block leakage of the microwave to the outside in an open space between the inside and outside of the metallic body, wherein the microwave leakage prevention part comprises a form in which a plurality of rods for cavity resonance is erected in a direction parallel to the opening to be one-dimensionally or two-dimensionally arranged on a plate fixed along the exterior perimeter around the opening of the metallic body.

2. The microwave induction heating device of claim 1, wherein the target material is disposed on the top, bottom, side, or central axis of a through-hole of the dielectric resonator.

3. The microwave induction heating device of claim 1, wherein the target material comprise a conductive material having a thickness with sheet resistance of 0.1 ohm/square or more, or a chip device having a thin film electrode.

4. The microwave induction heating device of claim 1, wherein the target material comprises a flat surface, a spherical surface, a curved surface, a cylindrical surface, or a combination thereof.

5. The microwave induction heating device of claim 1, wherein the dielectric resonator comprises a cylindrical form, a hexahedral column form, a spherical form, a rounded corner form, a predetermined arbitrary form without symmetry, a form with a through-hole in the center, a form in which a resonator is divided vertically or horizontally and arranged to be spaced a predetermined distance apart from each other, or a form in which a plurality of resonators is combined.

6. The microwave induction heating device of claim 1, wherein the microwave input part comprises a coaxial waveguide form coupled to the coaxial waveguide of the metallic body.

7. The microwave induction heating device of claim 1, wherein the microwave coupler comprises a loop-shaped metal disposed to be spaced a predetermined distance apart from the bottom of the dielectric resonator in the vertical direction.

8. The microwave induction heating device of claim 1, wherein the microwave coupler comprises a bar shape disposed to be spaced a predetermined distance apart from the side or bottom of the dielectric resonator.

9. The microwave induction heating device of claim 1, further comprising a control device configured to adjust the separation distance between the microwave coupler and the dielectric resonator on the basis of the coupling constant of the microwave coupler and the dielectric resonator to control the intensity of a microwave transmitted to the dielectric resonator.

10. The microwave induction heating device of claim 9, wherein the control device is configured to control the separation distance between the sidewall of the metallic body and the dielectric resonator to adjust the resonance frequency of the electromagnetic field in a resonance mode of the dielectric resonator.

11. The microwave induction heating device of claim 1, wherein the microwave leakage prevention part comprises a cavity resonator or a waveguide coupled around the open space connecting the inside and the outside of the metallic body on the periphery of a path through which the target material is loaded or unloaded.

12. The microwave induction heating device of claim 1, comprising a structure for induction heating of the target material that is loaded above the opening of the metallic body on the dielectric resonator so as to be spaced a predetermined distance apart from the top of the dielectric resonator.

13. The microwave induction heating device of claim 1, wherein the dielectric resonator comprises a through-hole on the central axis and an opening formed in at least one of the top and bottom of the metallic body on the central axis of the through-hole, and wherein the target material is loaded to or unloaded from the through-hole through the open space of the opening.

14. A microwave induction heating device comprising:

a microwave input part configured to receive a microwave;

a microwave coupler connected to the microwave input part;

a dielectric resonator disposed to be spaced a predetermined distance apart from the microwave coupler and configured to operate based on a microwave received from the microwave coupler;

a metallic body disposed to surround the microwave input part, the microwave coupler, and the dielectric resonator to prevent leakage of the microwave to the outside; and a microwave leakage prevention part coupled to the exterior of the metallic body and configured to block leakage of the microwave to the outside in an open space between the inside and outside of the metallic body, wherein the dielectric resonator comprises a through-hole on the central axis, and wherein the microwave leakage prevention part comprises a form in which a plurality of rods for cavity resonance is one-dimensionally or two-dimensionally arranged on a plate fixed along the exterior perimeter around the opening of the metallic body such that the longitudinal direction thereof is perpendicular to the central axis.

15. The microwave induction heating device of claim 1, further comprising a loader configured to load or unload the target material by moving the same, wherein the loader continuously or discontinuously changes the induction heating area of the target material.

16. The microwave induction heating device of claim 1, further comprising one or more second dielectric resonators and one or more second microwave couplers inside the metallic body, wherein the one or more second microwave couplers are configured to apply microwaves to the one or more second dielectric resonators, respectively.

17. The microwave induction heating device of claim 1, wherein the dielectric resonator is configured to form a magnetic field to induction-heat the target material.

18. The microwave induction heating device of claim 1, wherein the dielectric resonator is configured as a dielectric having a dielectric constant value of 3 or more and a loss tangent value of 0.0005 or less.

* * * * *